(12) United States Patent
Cha (10) Patent No.: US 9,122,910 B2
(45) Date of Patent: Sep. 1, 2015

(54) METHOD, APPARATUS, AND SYSTEM FOR FRIEND RECOMMENDATIONS

(71) Applicant: TENCENT TECHNOLOGY (SHENZHEN) COMPANY LIMITED, Shenzhen (CN)

(72) Inventor: Wen Cha, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 39 days.

(21) Appl. No.: 14/090,069

(22) Filed: Nov. 26, 2013

(65) Prior Publication Data

US 2014/0301612 A1 Oct. 9, 2014

Related U.S. Application Data

(63) Continuation of application No. PCT/CN2013/075066, filed on May 2, 2013.

(51) Int. Cl.
*G06K 9/00* (2006.01)
*G06Q 50/00* (2012.01)
*G06Q 10/10* (2012.01)
*H04L 29/08* (2006.01)

(52) U.S. Cl.
CPC ........ *G06K 9/00221* (2013.01); *G06K 9/00677* (2013.01); *G06Q 10/10* (2013.01); *G06Q 50/01* (2013.01); *H04L 67/12* (2013.01)

(58) Field of Classification Search
CPC ............................ G06K 9/0021; H04L 65/403
USPC .......................................... 382/118; 709/204
See application file for complete search history.

(56) References Cited

U.S. PATENT DOCUMENTS

2011/0289011 A1* 11/2011 Hull et al. .................. 705/319
2013/0251201 A1* 9/2013 Zhou ............................ 382/103
2014/0201126 A1* 7/2014 Zadeh et al. .................. 706/52

FOREIGN PATENT DOCUMENTS

CN 102355534 A 2/2012
CN 102637183 A 8/2012
CN 102831176 A 12/2012

OTHER PUBLICATIONS

The World Intellectual Property Organization (WIPO) International Search Report for PCT/CN2013/075066 Jan. 16, 2014.

* cited by examiner

*Primary Examiner* — Ruiping Li
(74) *Attorney, Agent, or Firm* — Anova Law Group, PLLC (57) ABSTRACT

A method is for friend recommendation which includes obtaining a first picture sent by a user, and determining one or more users associated with the first picture based on attribute information of the first picture. The method also includes, when it is determined that a total number of the users associated with the first picture is two or more, detecting whether a first user and a second user from the one or more users associated with the first picture are friends. Further, the method includes, when it is detected that the first user and the second user are not friends, sending friend recommendation information to one of the first user and the second user, wherein the friend recommendation information contains information of the other of the first user and the second. It is more likely that the friend recommendation information is of real interest of the users receiving the information.

20 Claims, 7 Drawing Sheets

METHOD, APPARATUS, AND SYSTEM FOR FRIEND RECOMMENDATIONS

CROSS-REFERENCES TO RELATED APPLICATIONS

This application is a continuation of PCT Patent Application No. PCT/CN2013/075066, filed on May 2, 2013, which claims priority of Chinese Patent Application No. 201310121372.5, filed on Apr. 9, 2013, the entire contents of all of which are hereby incorporated by reference.

FIELD OF THE INVENTION

The present invention generally relates to Internet technologies and, more particularly, to methods, apparatus, and systems for recommending friends.

BACKGROUND

As smart phones, personal digital assistants (PDAs), and other mobile devices become increasingly popular, network services applied on mobile devices are growing. Specific network services need to be processed by specific clients, which include applications installed on smart phones.

With the increasing number of social networking sites, more and more users are using social networking sites. When user are using these social networking sites, one of the most common needs is to establish friend relationships based on the social networking sites.

Currently, many social networking sites can provide the functionality of recommending friends for the users, often using following two commonly-used methods.

The first friend-recommendation method includes: a server of a social networking site detects a user's friends list. When detecting that there are two friends in the user's friends list, but these two friends themselves are not mutual friends, the server can recommend one friend of the user to another friend of the user. For example, if user A has two friends, user B and user C, and user B and user C are not friends, the server can recommend user C to user B, or can recommend user B to user C.

The second friend-recommendation method includes: a server of a social networking site detects a user's registration information, such as place of origin, school, hobbies or residence, etc. The server then sends the user friend recommendation information of those that have one or more pieces of same registration information but are not yet the friends of the user. For instance, if user A and user B have same place of origin as Beijing in the registration information, and user A and user B are not friends, then the server can recommend user B to user A, or can recommend user A to user B.

However, under the currently-used friend recommendation methods, when a user receives friend recommendation information, the possibility of receiving recommendation information of a friend of real interest to the user is quite low. For example, the first friend recommendation method may recommend two users without any overlapping to each other. Also for example, when a user's place of origin is Beijing, China, using the second friend recommendation method, the server may send recommendation information of anyone having the place of origin as Beijing, China. Most likely such friend recommendation information is not truly wanted by the user. Therefore, the pool of candidates recommended by the above two methods is too large, and the friend recommendation information generated by these two methods cannot truly reflect the need to establish friend relationships among the users. On one hand, a large amount of friend recommendation information is not wanted by the users and, on the other hand, the server wastes a large amount of bandwidth and storage space in order to push and store such redundant friend recommendation information.

The disclosed methods and systems are directed to solve one or more problems set forth above and other problems.

BRIEF SUMMARY OF THE DISCLOSURE

One aspect of the present disclosure includes a method for friend recommendation. The method includes obtaining a first picture sent by a user, and determining one or more users associated with the first picture based on attribute information of the first picture. The method also includes, when it is determined that a total number of the users associated with the first picture is two or more, detecting whether a first user and a second user from the one or more users associated with the first picture are friends. Further, the method includes, when it is detected that the first user and the second user are not friends, sending friend recommendation information to one of the first user and the second user, wherein the friend recommendation information contains information of the other of the first user and the second.

Another aspect of the present disclosure includes a friend-recommendation apparatus. The apparatus includes a first acquisition module, a first determination module, a first detection module, and a first transmission module. The first acquisition module is configured to obtain a first picture sent by a user. The first determination module is configured to determine one or more users associated with the first picture based on attribute information of the first picture obtained by the first acquisition module. Further, the first detection module is configured to, when the first determination module determines that a total number of the users associated with the first picture is two or more, detect whether a first user and a second user from the one or more users associated with the first picture are friends. The first transmission module is configured to, when the first detection module detects that the first user and the second user are not friends, send friend recommendation information to one of the first user and the second user, wherein the friend recommendation information contains information of the other of the first user and the second user.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings.

Figure 10:
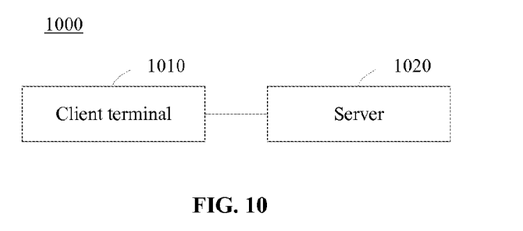
FIG. 10 is a schematic diagram of an exemplary friend recommendation system consistent with the disclosed embodiments.

FIG. 10 is a schematic diagram of an exemplary friend recommendation system consistent with certain disclosed embodiments. As shown in FIG. 10, friend recommendation system 1000 may include a server 1020 and a client terminal 1010, etc. The server 1020 and the client terminal 1010 may be coupled through a communication network for information exchange, such as IM (instant message) communication. Although only one client terminal 1010 and one server 1020 are shown in the friend recommendation system 1000, any number of client terminals 1010 or servers 1020 may be included, and other devices may also be included.

Further, the communication network between the client terminal 1010 and the server 1020 may include any appropriate type of communication network for providing network connections to the server 1020 and client terminal 1010, such as the Internet or other types of computer networks or telecommunication networks, either wired or wireless.

A client terminal, as used herein, may refer to any appropriate user terminal with certain computing capabilities, such as a smart phone, a personal computer (PC), a work station computer, a server computer, a hand-held computing device (tablet), a mobile phone, or any other user-side computing device. A client terminal may run certain client software programs to implement certain functionalities, such as social networking client-side functions, short message client-side functions, etc. Such client-side software programs may be referred as a client-side or simply a client. One or more copies of a client-side software program may be run simultaneously on a client terminal. Further, the client may be started by the client terminal automatically or by a user of the client terminal. That is, a user may be associated with the client terminal or with a client or clients. Unless explicitly described, the client terminal, the client, and the user may together or individually refer to a collection of the client terminal/client/user (e.g., client terminal 1010, client 1010, or user 1010).

A server, as used herein, may refer one or more server computers configured to provide certain server functionalities, such as social networking sites, web browsing, database management, and search engines. A server may also include one or more processors to execute computer programs in parallel.

Figure 11:
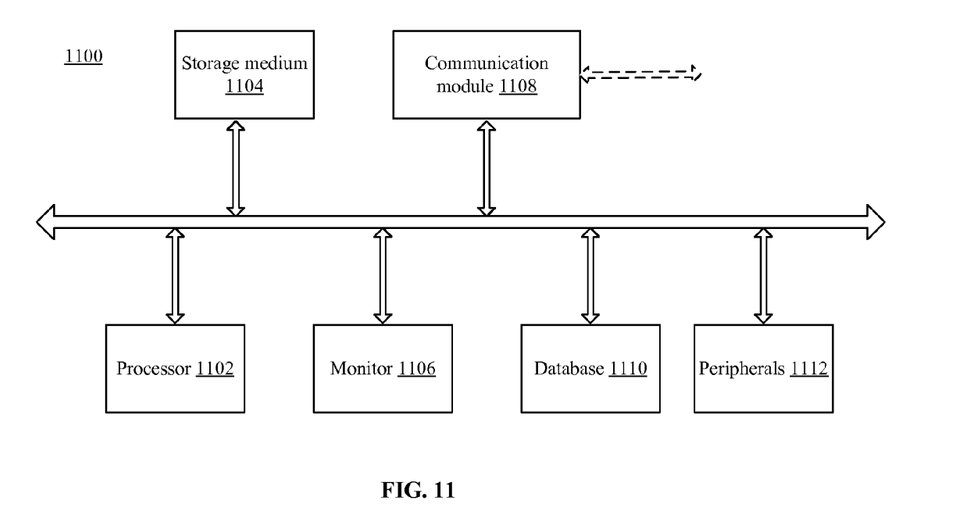
FIG. 11 illustrates a block diagram of an exemplary computer system consistent with the disclosed embodiments.

Server 1020 and/or client terminal 1010 may be implemented on any appropriate computing platform. FIG. 11 shows a block diagram of an exemplary computer system 1100 capable of implementing server 1020 and/or client terminal 1010.

As shown in FIG. 11, computer system 1100 may include a processor 1102, a storage medium 1104, a monitor 1106, a communication module 1108, a database 1110, and peripherals 1112. Certain devices may be omitted and other devices may be included.

Processor 1102 may include any appropriate processor or processors. Further, processor 1102 can include multiple cores for multi-thread or parallel processing. Storage medium 1104 may include memory modules, such as ROM, RAM, flash memory modules, and erasable and rewritable memory, and mass storages, such as CD-ROM, U-disk, and hard disk, etc. Storage medium 1104 may store computer programs for implementing various processes, when executed by processor 1102.

Further, peripherals 1112 may include I/O devices such as keyboard and mouse, and communication module 1108 may include network devices for establishing connections through the communication network. Database 1110 may include one or more databases for storing certain data and for performing certain operations on the stored data, such as database searching.

Figure 1:
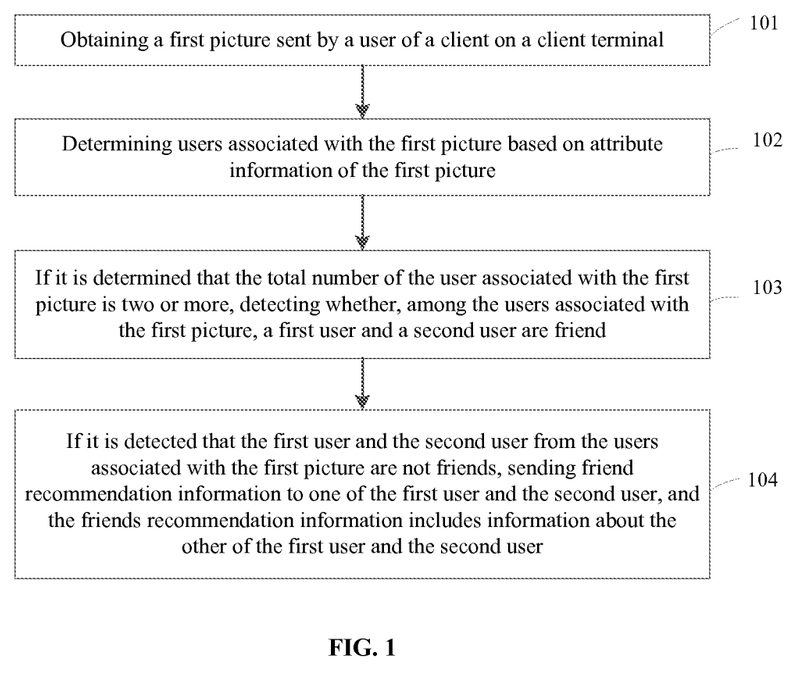
FIG. 1 is a flowchart of an exemplary friend recommendation method consistent with the disclosed embodiments.

In operation, server 1020 and/or client terminal 1010 may perform certain methods to achieve IM communication and certain social networking functions, etc. FIG. 1 illustrates a flowchart of an exemplary friend recommendation method consistent with the disclosed embodiments. The friend recommendation method may be implemented on a server, such as a social networking site server, and/or on a client. As shown in FIG. 1, the method includes the following steps:

Step 101, obtaining a first picture sent by a user of a client on a client terminal.

Step 102, determining clients associated with the first picture based on attribute information of the first picture.

Step 103, if it is determined that the total number of the users associated with the first picture is two or more, detecting whether, among the users associated with the first picture, a first user of a first client and a second user of a second client are friends. The first client and the second client may often be from different client terminals. However, in certain embodiments, the first client and the second client may also be from a same client terminal.

The first user may be the same user sending the first picture, or the second user may be the same user sending the first picture. However, the first user and the second user may be different from each other.

It should be noted that, the first user may be any user from the users associated with the first picture, and the second user may also be any user from the users associated with the first picture. In addition to the first user and the second user, the users associated with the first picture may also include other users.

Step 104, if it is detected that the first user and the second user from the users associated with the first picture are not friends, sending friend recommendation information to one of the first user and the second user, and the friend recommendation information includes information about the other of the first user and the second user.

Thus, by determining all users associated with a picture and sending friend recommendation information to those from the associated users but not yet being friends, because of an increased possibility of becoming friends for those appearing in a single picture, it is much more likely that the friend recommendation information is of real interest of the users receiving the information.

Figure 2:
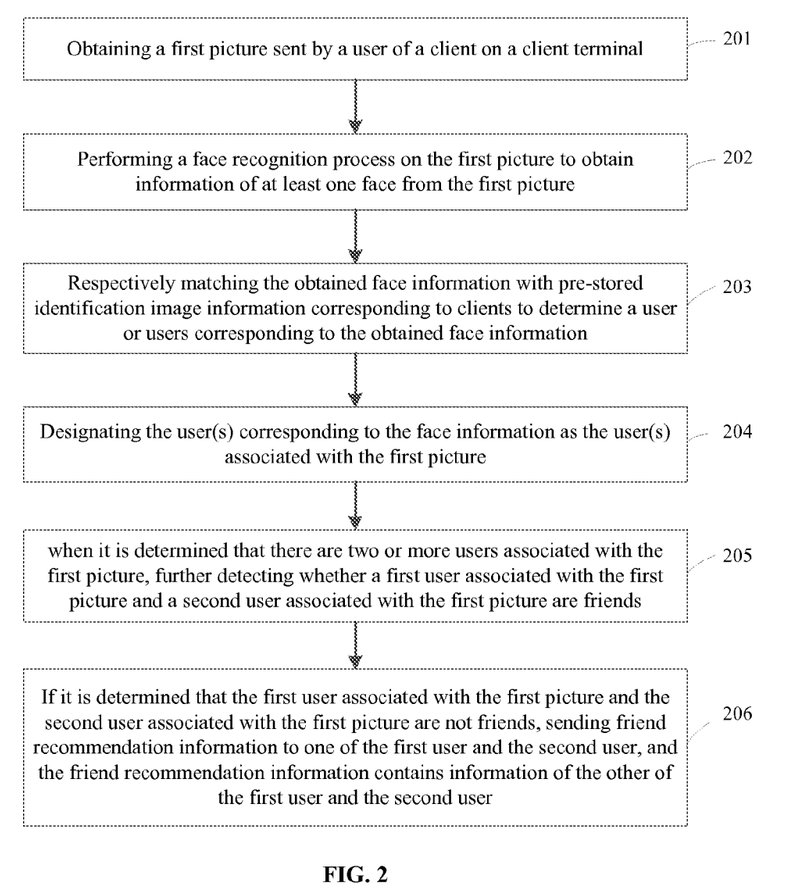
FIG. 2 is a flowchart of another exemplary friend recommendation method consistent with the disclosed embodiments.

FIG. 2 illustrates another exemplary friend recommendation method consistent with the disclosed embodiments. The friend recommendation method may be implemented on a server, such as a social networking site server, and/or on a client. As shown in FIG. 2, the friend recommended method includes:

Step 201, obtaining a first picture sent by a user of a client on a client terminal.

The client terminal first sends the first picture to the server and, correspondingly, the server receives a first picture sent by the client/client terminal.

Step 202, performing a face recognition process on the first picture to obtain information of at least one face from the first picture.

In certain embodiments, the client sends the first picture contains face information of at least one user. For example, the face information may correspond to the user sending the first picture, or the face information may correspond to other users.

Step 203, respectively matching the obtained face information with identification image information corresponding to pre-stored users to determine a user or users corresponding to the obtained face information.

In certain embodiments, the first picture sent to the server by the client can contain information on multiple faces. For example, when user A uploads to the server with a picture of friends gathering, the picture may contain face information of multiple people or users (e.g., when these multiple people may be users of one or more social network sites).

In the picture, those users who know user A may be unknown among themselves. If one user knows another user, the two users may already be friends in one or more social networks. For example, user A knows user B and, during the friends gathering, user A brings a new friend user C. Before the gathering, user C may be unknown to user B. Thus, because user B and user C all know user A, it is likely that user B and user C may want to be mutual friends.

For another example, the first picture may also include a user D, such as a customer service staff during the gathering. The user D does not know user A, and it is less likely for user D to interact with other users in the picture later in life. Thus, it may be unnecessary to recommend user D to other users in the first picture.

Therefore, in practical applications, in order to improve the probability that the recommended friend information for a user is of real interest to the user, an initial screening may be performed on the face information in the first picture and then users corresponding to the selected face information may be determined.

It should be noted that, if a server wants to send a user with friend recommendation information, the server may need to ensure that the user receiving the friend recommendation information and the user being recommended in the friend recommendation information are all registered on the server. All the users registered on the server are considered as pre-stored users. Identification image information of these pre-stored users may then be matched with the face information of the first picture to determine the users associated with the first picture.

In certain embodiments, the selected face information of at least one human face in the first picture is respectively matched with the identification image information of the pre-stored users to determine the users corresponding to the face information. More particularly:

First, obtaining a friend list of the user sending the first picture.

In a social networking site, a user's friend list is usually stored in a server corresponding to the social networking site. Thus, the server corresponding to the social networking site can directly use identification information of the user sending the first picture, such as an account number of the user, etc., to obtain the user's friend list.

Second, obtaining identification image information corresponding to each user on the obtained friend list.

As used herein, the identification image information may include any information that can uniquely identify the corresponding user. For instance, the identification image information may include a real profile photo or image of the user (e.g., a head picture) uploaded to the server by the client. The profile photo may be uploaded by the client to the server at the time of registration, or the profile photo can also be uploaded to the server by the client after registration.

When a user registers with a social networking site, the server may require the user to upload a profile photo, and may verify the profile photo information uploaded by the user. If the server verifies that the profile photo information is a real head photo of the user, the server may allow the user to register for a user account. Alternatively, if the user did not upload the profile photo when registering, the server may still allow the user to register. Accordingly, the user may upload the profile image to the server after the registration.

Thus, based on the friend list of the sending user, the server can locate other users corresponding to the friend list and, according to the information of the users, obtain identification image information corresponding to the users.

Third, matching face information in the first picture respectively with the identification image information of each user on the friend list to determine a user or users corresponding to the face information.

As explained above, the face information in the first picture is first obtained, and the obtained face information is matched with the identification image information of each user on the friend list. If a match is successful, the matched user can be determined as a user corresponding to the face information. That is, the user(s) who is in the first picture and is friend with the user sending the first picture can be determined.

Step 204, designating the user(s) corresponding to the face information as the user(s) associated with the first picture.

However, under certain circumstances, such user(s) may be unavailable or unrecognizable, or simply does not exist. When the users identified by the face recognition on the first picture do not include the user who uploaded the first picture, the user uploading the first picture may be determined as the user associated with the first picture.

For example, the first picture sent by the client to the server may be a picture taken by the user when attending a gathering event. However, the user was not in the picture for some reasons. Accordingly, the users associated with the first picture, as determined by the face recognition process on the first picture, do not include the user sending the first picture. Thus, there might be certain users the first picture unknown to the sending user, and it is more likely that two users attending a same gathering may become friends. At this point, in order to improve the possibility that the user sending the first pictures and other users in the first picture become friends, the user sending the first picture can also be identified as the user associated with the first picture.

Step 205, when it is determined that there are two or more users associated with the first picture, further detecting whether a first user associated with the first picture and a second user associated with the first picture are friends.

In certain embodiments, the first user or the second user may be any user determined as being associated with the first picture. However, when the first user and the second user are determined as the users associated with the first picture based on the friend list, the first user might not include the user sending the first picture, or the second user might not include the user sending the first picture.

Figure 3:
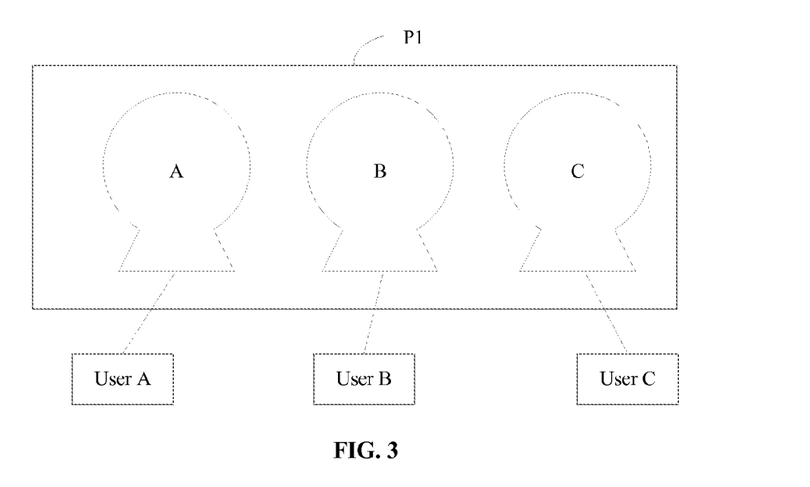
FIG. 3 is a schematic diagram of a first picture containing information of a plurality of individual faces consistent with the disclosed embodiments.

FIG. 3 illustrates an exemplary first picture containing face information of multiple faces. As shown in FIG. 3, a total number of three (3) users are determined as being associated with first picture P1, user A, user B, and user C, respectively. It may be further determined whether user A and user B are friends, whether user A and user C are friends, or whether user B and user C are friends.

When a friend list of user A is used, if user B and user C are friends listed in the user A's friend list, it may only need to directly determine whether user B and user C are friends.

It should be noted that the first user may be any user from all users associated with the first picture, while the second user may be any user from all users associated with the first picture other than the first user. In addition to the first user and the second user, the users associated with the first picture can also include other users.

Step 206, if it is determined that the first user associated with the first picture and the second user associated with the first picture are not friends, sending friend recommendation information to one of the first user and the second user, and the friend recommendation information contains information of the other of the first user and the second user.

Referring to FIG. 3, when it is determined that user A and user B are not friends, friend recommendation information can be sent to user A, and the friend recommendation information contains information about user B. Alternatively, friend recommendation information can be sent to user B, and the friend recommendation information contains information about user A.

Similarly, when it is determined that user A and user C are not friends, friend recommendation information can be sent to user A, and the friend recommendation information contains information about user C. Alternatively, friend recommendation information can be sent to user C, and the friend recommendation information contains information about user A. And so on.

Thus, by determining all users associated with a picture based on a face recognition process on the first picture and sending friend recommendation information to those from the associated users but not yet being friends, because of an increased possibility of becoming friends for those appearing in a single picture, it is much more likely that the friend recommendation information is of real interest of the users receiving the information.

Figure 4:
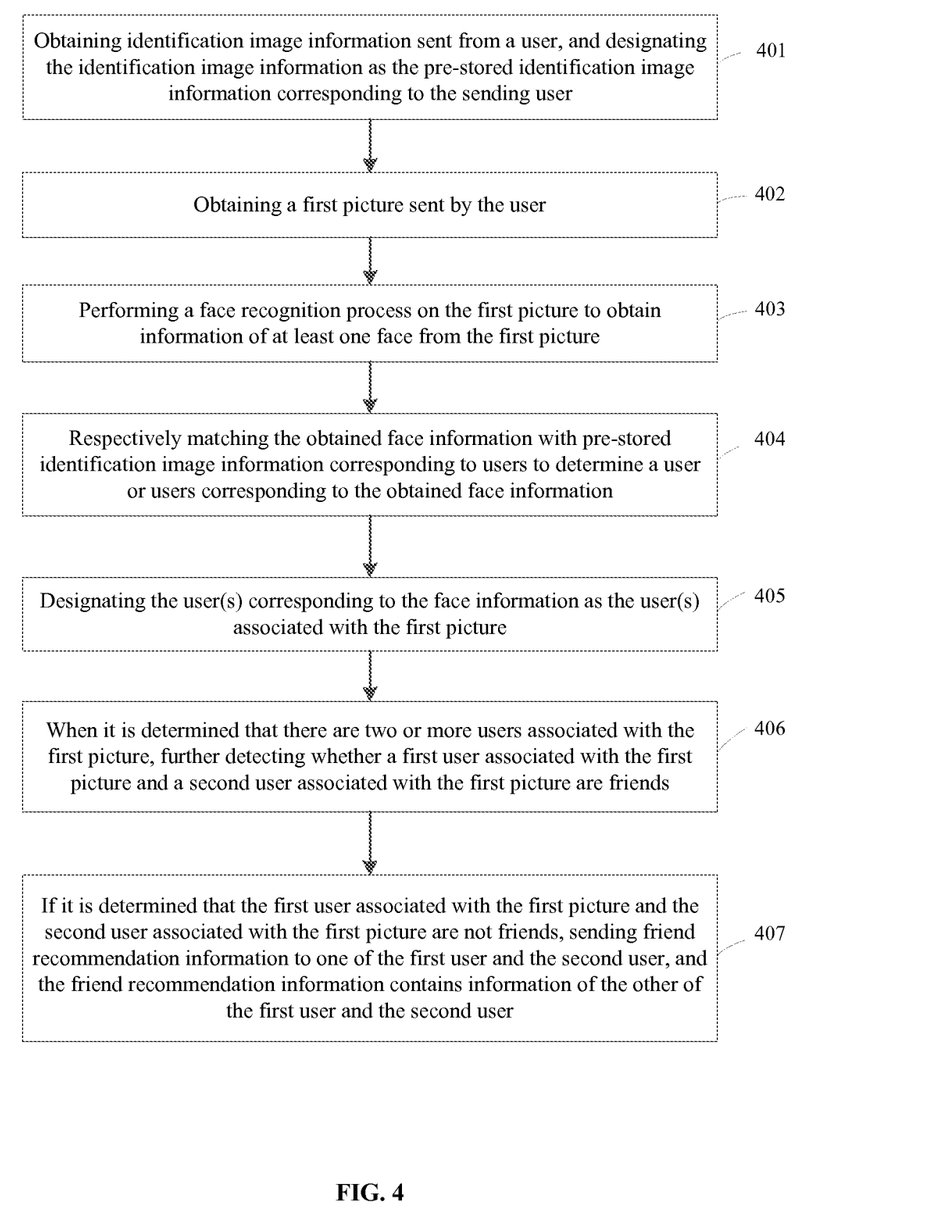
FIG. 4 is a flowchart of another exemplary friend recommendation method consistent with the disclosed embodiments.

FIG. 4 illustrates another exemplary friend recommendation method consistent with the disclosed embodiments. The friend recommendation method may be implemented on a server, such as a social networking site server, and/or on a client. As shown in FIG. 4, the friend recommended method includes:

Step 401, obtaining identification image information sent from a user, and designating the identification image information as the pre-stored identification image information corresponding to the sending user.

If the client enables the functionality of friend recommendation through pictures or images, the user can first send the server with the identification image information. Of course, before the server starts friend-recommendation using pictures, the server may request the user to send the identification image information, such that the user can upload the identification image information to the server.

The identification image information may be used to uniquely identify the user. For example, the identification image information may include an image containing face information of the user uploaded to the server by the user.

Specifically, when the server needs to start friend-recommendation using an image sent by the user, the server may request the user to upload the identification image information corresponding to the user. Accordingly, the user may then upload identification image information to the server based on the request from the server, and the identification image information may contain face information.

Further, the user may request that the server verifies the face information of the identification image information, or the server may verify the face information of the identification image information after receiving the identification image information. After the server verifies that the received identification image information containing the face information as real image information (e.g., a head picture), the server may bind the identification image information with the corresponding user, and may designate the identification image information as the pre-stored identification image information corresponding to the user.

Step 402, obtaining a first picture sent by the user of the client on the client terminal.

The user first sends the first picture to the server and, correspondingly, the server receives a first picture sent by the user. The first picture sent by the user sends may be different from the identification image information sent by the user.

Step 403, performing a face recognition process on the first picture to obtain information of at least one face from the first picture.

In certain embodiments, the first picture sent by the user may contain face information of at least one user. For example, the face information may correspond to the user sending the first picture, or the face information may correspond to other users.

Although Step 401 is described before Step 402 and Step 403, Step 401 may be performed at the same time as Step 402 or Step 403, or may be performed after Step 403.

Step 404, respectively matching the obtained face information with identification image information corresponding to pre-stored users to determine a user or users corresponding to the obtained face information.

In certain embodiments, the first picture sent by the user to the server may contain information on multiple faces. For example, when user A uploads to the server with a picture of friends gathering, the picture may contain face information of many people.

In the first picture, those users who know user A may be unknown among themselves. For example, user A knows user B and, during the friends gathering, user A brings a new friend user C. Before the gathering, user C may be unknown to user B. Thus, because user B and user C all know user A, it is likely that user B and user C may want to be friends.

For another example, the picture may also include a user D, such as a customer service staff during the gathering. The user D does not know the user A, and it is less likely for user D to interact with other users in the first picture later in life. Thus, it may be unnecessary to recommend user D to other users in the first picture.

Therefore, in practical applications, in order to improve the probability that the recommended friend information for a user is really wanted by the user, an initial screening may be performed on the face information in the first picture and users corresponding to the selected face information may then be determined.

It should be noted that, if a server wants to send a user with friend recommendation information, the server may need to ensure that the user receiving the friend recommendation information and the user being recommended in the friend recommendation information are all registered on the server.

All the users registered on the server are considered as pre-stored users. Identification image information of these pre-stored users may then be matched with the face information of the first picture to determine the users associated with the first picture.

In certain embodiments, the selected face information of at least one human face in the first picture is respectively matched with the identification image information of the pre-stored users to determine the users corresponding to the face information. More particularly:

First, obtaining a friend list of the user sending the first picture.

In a social networking site, a user's friend list is usually stored in a server corresponding to the social networking site. Thus, the server corresponding to the social networking site can directly use identification information of the user sending the first picture, such as an account number of the user, etc., to obtain the user's friend list.

Second, obtaining identification image information corresponding to each user on the friend list.

When the server provides friend recommendation through images, before the server starts friend-recommendation, each user may send its corresponding identification image information to the server.

Thus, based on the friend list, the server can locate the users corresponding to the friend list and, according to the information of the users, obtain identification image information corresponding to the users.

Third, matching the face information in the first picture respectively with the identification image information of each user on the friend list to determine a user or users corresponding to the face information.

As explained above, the face information in the first picture may be obtained first, and the obtained face information is matched with the identification image information of each user on the friend list. If a match is successful, the matched user can be determined as a user corresponding to the face information. That is, the user(s) who is in the first picture and is friend with the user sending the first picture can be determined.

Step 405, designating the user(s) corresponding to the face information as the user(s) associated with the first picture.

Under certain circumstances, such user(s) may be unavailable or unrecognizable, or simply does not exist. When the users identified by the face recognition on the first picture do not include the user uploading the first picture, the user uploading the first picture may be determined as the user associated with the first picture.

For example, the first picture sent by the user to the server may be a picture taken by the user when attending a gathering event. However, the user was not in the picture for some reasons. Accordingly, the users associated with the first picture, as determined by the face recognition processing on the first picture, do not include the user sending the first picture. Thus, there might be certain users in the first picture unknown to the sending user, and it is more likely that two users attending a same gathering may become friends. At this point, in order to improve the possibility that the user sending the first pictures and other users in the first picture become friends, the user sending the first picture can also be designated as the user associated with the first picture.

When it is determined that there are two or more users associated with the first picture, the following Step 406 may be performed.

Step 406, when it is determined that there are two or more users associated with the first picture, further detecting whether a first user associated with the first picture and a second user associated with the first picture are friends.

If, in Step 405, the first user and the second user are determined as the users associated with the first picture based on the friend list, the first user might not include the user sending the first picture, or the second user might not include the user sending the first picture.

Referring to FIG. 3, user A, user B, and user C are associated with the first picture P1. The server may determine whether user A and user B are friends, whether user A and user C are friends, or whether user B and user C are friends.

When a friend list of user A is used, if user B and user C are friends listed in the user A's friend list, it may only need to directly determine whether user B and user C are friends.

It should be noted that the first user may be any user from all users associated with the first picture, while the second user may be any user from all users associated with the first picture other than the first user. In addition to the first user and a second user, the users associated with the first picture may also include other users.

If it is determined that the first user associated with the first picture and the second user associated with the first picture are not friends, the following Step 407 may be performed.

Step 407, if it is determined that the first user associated with the first picture and the second user associated with the first picture are not friends, sending friend recommendation information to one of the first user and the second user, and the friend recommendation information contains information of the other of the first user and the second user.

Referring to FIG. 3, when it is determined that user A and user B are not friends, friend recommendation information can be sent to user A, and the friend recommendation information contains information about user B. Alternatively, friend recommendation information can be sent to user B, and the friend recommendation information contains information about user A.

Similarly, when it is determined that user A and user C are not friends, friend recommendation information can be sent to user A, and the friend recommendation information contains information about user C. Alternatively, friend recommendation information can be sent to user C, and the friend recommendation information contains information about user A. And so on.

Figure 5:
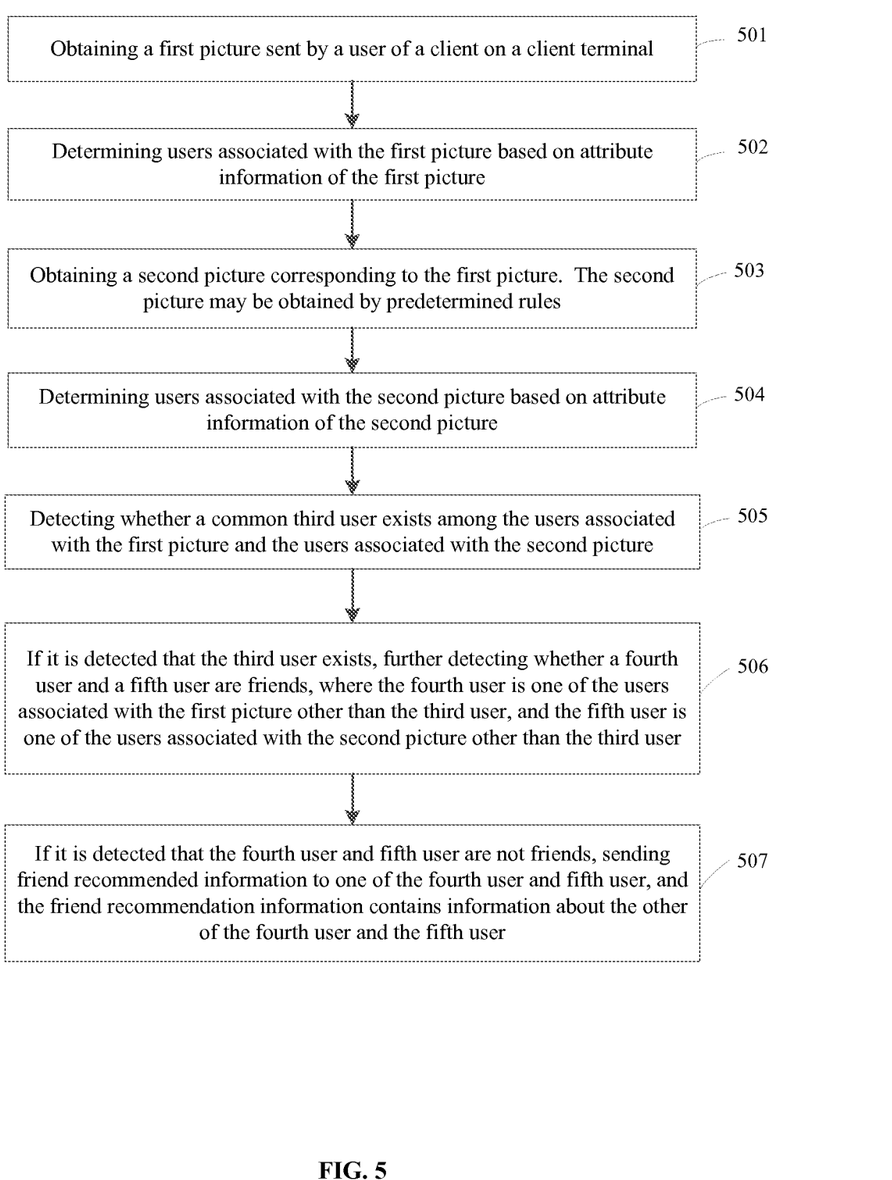
FIG. 5 is a flowchart of another exemplary friend recommendation method consistent with the disclosed embodiments.

FIG. 5 illustrates another exemplary friend recommendation method consistent with the disclosed embodiments. The friend recommendation method may be implemented on a server, such as a social networking site server, and/or on a client. As shown in FIG. 5, the friend recommended method includes:

Step 501, obtaining a first picture sent by a user of a client on a client terminal.

Step 502, determining users associated with the first picture based on attribute information of the first picture.

The attribute information of the first picture may include human face information, and determining users associated with the first picture based on attribute information of the first picture may include: performing a face recognition process on the first picture to obtain information of at least one face from the first picture; respectively matching the obtained face information with identification image information corresponding to pre-stored users to determine a user or users corresponding to the obtained face information; and designating the user(s) corresponding to the face information as the user(s) associated with the first picture.

The attribute information of the first picture may also include source information, and determining users associated with the first picture based on attribute information of the first picture may include: based on the source information of the first picture, designating the user sending the first picture as the user associated with the first picture.

It should be noted that, although face information and source information are used to illustrate the attribute information of the first picture, the attribution information may include any type of information of the first picture. For example, the attribution information of the first picture may include pets, landmarks, cartoon images, etc., in the first picture. Such attribute information may be used to indirectly determine the users associated with the first picture.

For example, based on attribute information of a Chihuahua dog being in the first picture, a third picture having a Chihuahua dog may be determined, and the user sending the third picture may also be determined. Further, friend recommendation information can be sent to one of the user sending the third picture and the user sending the first picture, and the friend recommendation information contains information on the other of the user sending the third picture and the user sending the first picture. Because different users send to the server with pictures containing a same type of subject, it is likely that the different users may be interested in the same type of subject. It might be possible to recommend them to become friends.

Step 503, obtaining a second picture corresponding to the first picture. The second picture may be obtained by using certain predetermined rules.

For example, the time when the first picture was taken may be obtained. Based on the picture-taken time, a first predetermined range including the obtained picture-taken time may be determined. Another picture taken within the first predetermined range may be determined as the second picture corresponding to the first picture.

When a picture-taking equipment takes a picture, the picture taken by such equipment may have picture-taken time shown on the picture or the picture-taken time may be included in the attributes of the picture. After the user uploads the picture to the server, the server may analyze the picture-taken time shown on the picture or the picture-taken time included in the attributes of the picture.

Also for example, the place or location where the first picture was taken may be obtained. Based on the picture-taken location, a second predetermined range including the obtained picture-taken location may be determined. Another picture taken within the second predetermined range may be determined as the second picture corresponding to the first picture.

When a picture-taking equipment has positioning function, such as positioning by the GPS (Global Positioning System), etc., and such positioning function is enabled in the picture-taking equipment, the picture-taken location information may be automatically included in the attributes of the picture.

Of course, if the picture-taking equipment does not contain the positioning function, or the positioning function is not enabled in the picture-taking equipment, the user can edit the picture taken by the picture-taking equipment to show the picture-taken location on the picture or to include the picture-taken location in the attributes of the picture.

For example, if the attributes of the picture does not automatically carry the picture-taken location, the user may add the picture-taken location on the picture before sending the picture to the server. For instance, before sending the picture to the server, the user may add the picture-taken location of the picture in the description and edit box of the picture. The contents in the description and edit box of the picture may become additional information of the picture.

Afterwards, the user uploads such picture containing picture-taken location to the server. The server may analyze the picture-taken location shown on the picture, the picture-taken location included in the attributes of the picture, or the picture-taken location in the additional information of the picture (i.e., contents in the description and edit box of the picture).

For example, multiple users may attend an academic conference together and it may be more likely for these users attending the conference to become friends. Particularly, a first user may send to the server with a first picture containing a photo of the first user and the conference speaker, while a second user may send to the server with a second picture containing a photo of the second user and the conference speaker. It may be possible that the first user and the second user may need to discuss what matter presented in the conference after the conference is concluded, or may need to explore areas related to the academic conference in long-term. It is then more likely for the first user and the second to become friends. Thus, the first picture and the second picture may be corresponding to each other.

Further, when two pictures were taken at substantially close locations and within substantially close time, the two pictures may be identified as pictures taken in a same scene and, thus, correspond to each other.

Thus, when two pictures can be associated based on certain predetermined rule(s), it may be more likely for individual users respectively associated with the two pictures to become friends.

It should be noted that, the user sending the first picture to the server and the user sending the second picture to the server may be the same user, or may be different users. When the same user is involved, the server analyzes the two pictures sent by the same user. That is, the server may analyze the two pictures sent by the same user, or may analyze two pictures respectively sent by the two different users.

Step 504, determining users associated with the second picture based on attribute information of the second picture.

The attribute information of the second picture may include human face information, and determining users associated with the second picture based on attribute information of the second picture may include: performing a face recognition process on the second picture to obtain information of at least one face from the second picture; respectively matching the obtained face information with identification image information corresponding to pre-stored users to determine a user or users corresponding to the obtained face information; and designating the user(s) corresponding to the face information as the user(s) associated with the second picture.

The attribute information of the second picture may also include source information, and determining users associated with the second picture based on attribute information of the second picture may include: based on the source information of the second picture, designating the user sending the second picture as the user associated with the second picture.

Step 505, detecting whether a common third user exists among the users associated with the first picture and the users associated with the second picture.

More specifically, it may detect or determine whether any user associated with the first picture is also associated with the second picture, or may detect whether any user associated with the second picture is also associated with the first picture. Any user that is associated with both the first picture and the second picture is designated as the third user.

If it is detected that the third user exists among the users associated with the first picture and the users associated with the second picture, Step 506 may be performed.

Step 506, if it is detected that the third user exists, further detecting whether a fourth user and a fifth user are friends, where the fourth user is one of the users associated with the first picture other than the third user, and the fifth user is one of the user associated with the second picture other than the third user.

When it is detected that the third user is associated with both the first picture and the second picture, the third user may be used as an intermediary to detect whether the fourth user associated with the first picture and the fifth user associated with the second picture are friends.

The fourth user and the fifth user may be different from the third user. If the fourth user is the same as the third user, detecting whether the fourth user associated with the first picture and the fifth user associated with the second picture are friends becomes detecting whether the third user associated with the first picture and the fifth user associated with the second picture are friends, which is equivalent to detecting whether the third user and the fifth user in the second picture are friends. Such scenarios are described in above sections and are omitted herein. The following descriptions assume that the fourth user and fifth user are different from the third user.

Thus, a collection of all users associated with the first picture may be defined as a first friend circle of the third user, and a collection of all users associated with the second picture may be defined as a second friend circle of the third user. Users in the first friend circle may be recommended to users in the second friend circle, or users in the second friend circle can be recommended to users in the first friend circle.

If it is detected that the fourth user and fifth user are not friends, the following Step 507 may be performed.

Step 507, if it is detected that the fourth user and fifth user are not friends, sending friend recommended information to one of the fourth user and fifth user, and the friend recommendation information contains information about the other of the fourth user and the fifth user.

Figure 6:
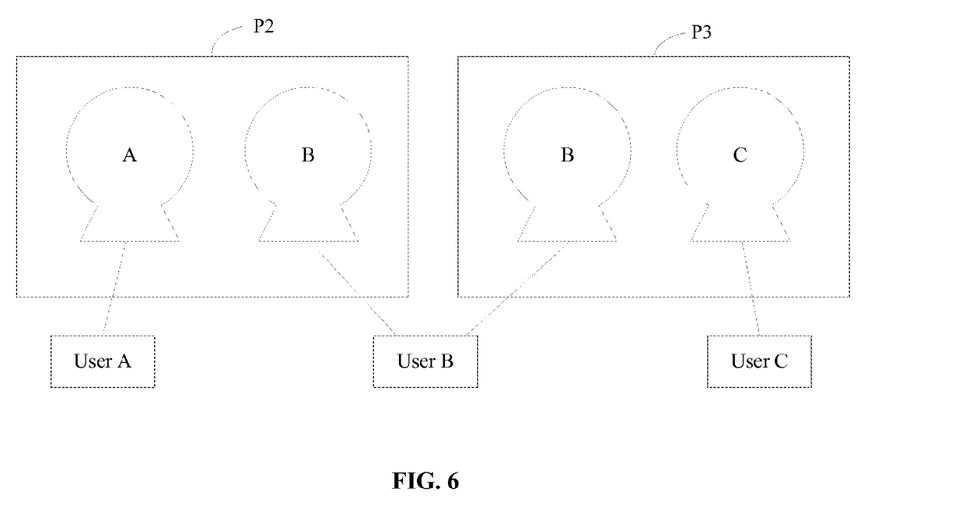
FIG. 6 is a schematic diagram of a same user associated with two pictures at the same time consistent with the disclosed embodiments.

FIG. 6 illustrates a same user being associated with two pictures at the same time. As shown in FIG. 6, user A and user B are associated with the first picture P2; while user B and user C are associated with the second picture P3. User B is associated with both P2 and P3 at the same time. Thus, it can be detected whether user A in P2 and user C in P3 are friends.

When it is detected that user A and user C are not friends, friend recommendation information can be sent to user A, and the friend recommendation information contains information about user C. Alternatively, friend recommendation information can be sent to user C, and the friend recommendation information contains information about user A.

Although Step 503 and Step 504 are described after Step 502, Step 503 and Step 504 may be performed at the same time as Step 502, or Step 503 and Step 504 may be performed before Step 502.

Thus, by determining a same user associated with two pictures at the same time, friend recommendation information can be sent to those respectively from the two pictures but not yet being friends. Because of an increased possibility of becoming friends for those appearing in pictures with the same user, it is much more likely that the friend recommendation information is of real interest of the users receiving the information.

Figure 7:
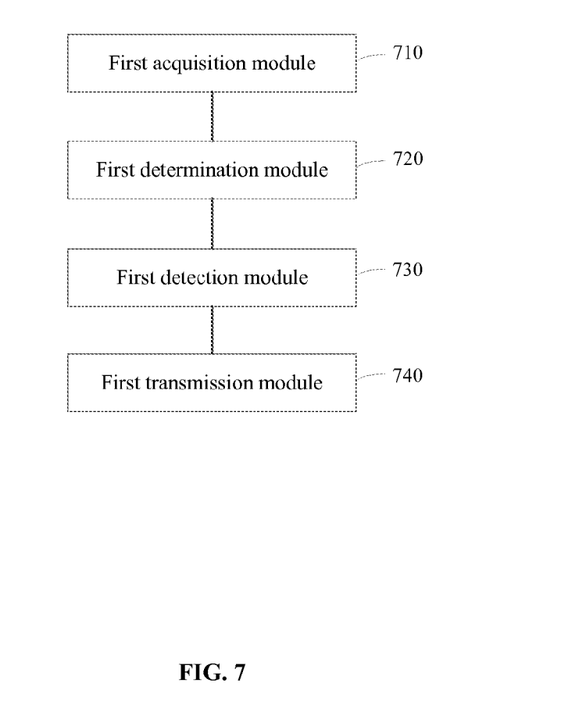
FIG. 7 is a schematic diagram of an exemplary friend recommendation apparatus consistent with the disclosed embodiments.

FIG. 7 illustrates an exemplary friend-recommendation apparatus consistent with the disclosed embodiments. The friend-recommendation apparatus may be implemented on the server or may coincide with the server and/or on a client, and the server may correspond to a social networking site.

As shown in FIG. 7, the friend-recommendation apparatus includes a first acquisition module 710, a first determination module 720, a first detection module 730, and a first transmission module 740. Other modules may also be included.

The first acquisition module 710 may be used to obtain a first picture sent by a user. The first determination module 720 may be used to determine users associated with the first picture based on attribute information of the first picture obtained by the first acquisition module 710.

The first detection module 730 may be used to, when the total number of the users associated with the first picture determined by the first determination module 720 is two or more, detect whether a first user and a second user from the users associated with the first picture are friends.

The first transmission module 740 may be used to, when the first detection module 730 determines that the first user and the second user from the users associated with the first picture are not friends, send friend recommendation information to one of the first user and the second user, and the friends recommendation information includes information about the other of the first user and the second user.

Figure 8:
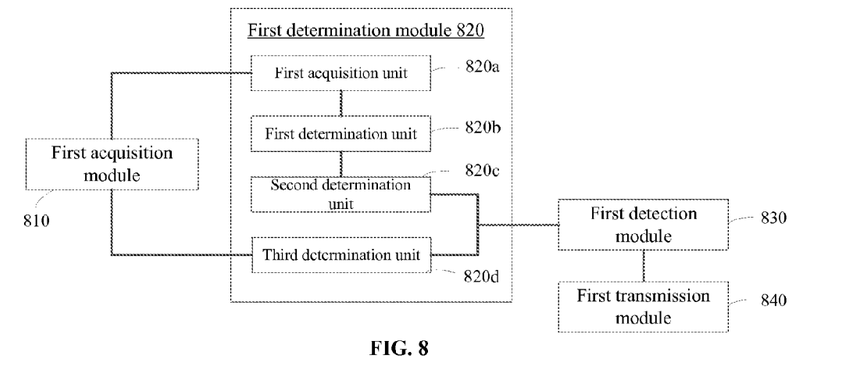
FIG. 8 is a schematic diagram of another exemplary friend recommendation apparatus consistent with the disclosed embodiments.

FIG. 8 illustrates another exemplary friend-recommendation apparatus consistent with the disclosed embodiments. The friend-recommendation apparatus may be implemented on the server or may coincide with the server, and/or on a client, and the server may correspond to a social networking site. As shown in FIG. 8, the friend-recommendation apparatus includes a first acquisition module 810, a first determination module 820, a first detection module 830, and a first transmission module 840. Other modules may also be used.

The first acquisition module 810 may be used to obtain a first picture sent by a user.

The first determination module 820 may be used to determine users associated with the first picture based on attribute information of the first picture obtained by the first acquisition module 810.

The attribute information of the first picture may include human face information, and the first determination module 820 may include a first acquisition unit 820a, a first determination unit 820b, and a second determination unit 820c.

The first acquisition unit 820a may be used to perform a face recognition process on the first picture obtained by the first acquisition module 810 to obtain information of at least one face from the first picture.

The first determination unit 820b may be used to respectively match the face information obtained by the first acquisition unit 820a with identification image information corresponding to pre-stored users to determine a user or users corresponding to the obtained face information.

The first determination unit 820b may include a first acquisition sub-unit, a second acquisition sub-unit, and a determination sub-unit (not shown).

The first acquisition sub-unit may be used to obtain a friend list of the user sending the first picture.

The second acquisition sub-unit may be used to obtain identification image information corresponding to each user on the friend list obtained by the first acquisition sub-unit.

The determination sub-unit may be used to match the face information in the first picture obtained by the first acquisition unit 820a respectively with the identification image information of each user on the friend list to determine a user or users corresponding to the face information.

The second determination unit 820c may used to designate the user(s) corresponding to the face information determined by the first determination unit 820b as the user(s) associated with the first picture.

The attribute information of the first picture may also include source information, and the first determination module 820 may further include a third determination unit 820*d*.

The third determination unit 820*d* may be used to, based on the source information of the first picture obtained by the first acquisition module 810, designate the user sending the first picture as the user associated with the first picture.

The first detection module 830 may be used to, when the first determination module 820 determines that two or more users are associated with the first picture, detect whether a first user associated with the first picture and a second user associated with the first picture are friends.

The first transmission module 840 may be used to, when the first detection module 830 determines that the first user associated with the first picture and the second user associated with the first picture are not friends, send friend recommendation information to one of the first user and the second user, and the friend recommendation information contains information of the other of the first user and the second user.

Figure 9:
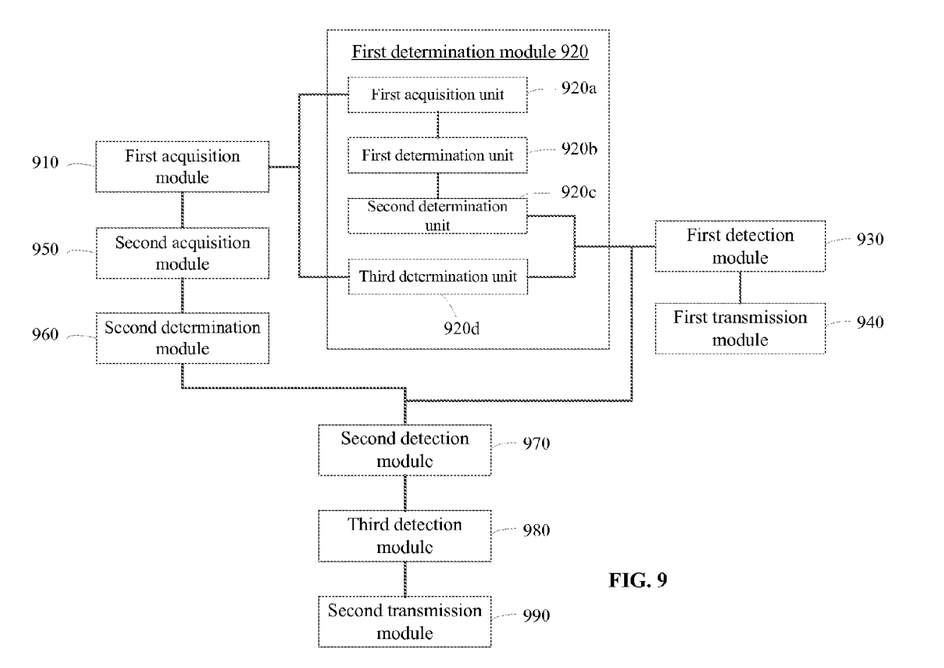
FIG. 9 is a schematic diagram of another exemplary friend recommendation apparatus consistent with the disclosed embodiments.

FIG. 9 illustrates another exemplary friend-recommendation apparatus consistent with the disclosed embodiments. The friend-recommendation apparatus may be implemented on the server or may coincide with the server, and the server may correspond to a social networking site.

As shown in FIG. 9, the friend-recommendation apparatus includes a first acquisition module 910, a first determination module 920, a first detection module 930, a first transmission module 940, a second acquisition module 950, a second determination module 960, a second detection module 970, a third detection module 980, and a second transmission module 990. Certain modules may be omitted and other modules may also be included. The various modules, units, and sub-units may be implemented by hardware, software, or a combination of hardware and software.

The first acquisition module 910 may be used to obtain a first picture sent by a user.

The first determination module 920 may be used to determine users associated with the first picture based on attribute information of the first picture obtained by the first acquisition module 910.

The attribute information of the first picture may include human face information, and the first determination module 920 may include a first acquisition unit 920*a*, a first determination unit 920*b*, and a second determination unit 920*c*.

The first acquisition unit 920*a* may be used to perform a face recognition process on the first picture obtained by the first acquisition module 910 to obtain information of at least one face from the first picture.

The first determination unit 920*b* may be used to respectively match the face information obtained by the first acquisition unit 920*a* with identification image information corresponding to pre-stored users to determine a user or users corresponding to the obtained face information.

The first determination unit 920*b* may further include a first acquisition sub-unit, a second acquisition sub-unit, and a determination sub-unit (not shown).

The first acquisition sub-unit may be used to obtain a friend list of the user sending the first picture.

The second acquisition sub-unit may be used to obtain identification image information corresponding to each user on the friend list obtained by the first acquisition sub-unit.

The determination sub-unit may be used to match the face information in the first picture obtained by the first acquisition unit 920*a* respectively with the identification image information of each user on the friend list to determine a user or users corresponding to the face information.

The second determination unit 920*c* may be used to designate the user(s) corresponding to the face information determined by the first determination unit 820*b* as the user(s) associated with the first picture.

The attribute information of the first picture may also include source information, and the first determination module 920 may further include a third determination unit 920*d*.

The third determination unit 920*d* may be used to, based on the source information of the first picture obtained by the first acquisition module 910, designate the user sending the first picture as the user associated with the first picture.

The first detection module 930 may be used to, when the first determination module 920 determines that two or more users are associated with the first picture, detect whether a first user associated with the first picture and a second user associated with the first picture are friends.

The first transmission module 940 may be used to, when the first detection module 930 determines that the first user associated with the first picture and the second user associated with the first picture are not friends, send friend recommendation information to one of the first user and the second user, and the friend recommendation information contains information of the other of the first user and the second user.

The second acquisition module 950 may be used to obtaining a second picture corresponding to the first picture obtained by the first acquisition module 910.

The second acquisition module 950 may include: a second acquisition unit and/or a third acquisition unit (not shown).

The second acquisition unit may be used to obtain the time when the first picture was taken; based on the picture-taken time, to determine a first predetermined range including the obtained picture-taken time; and to determine another picture taken within the first predetermined range as the second picture corresponding to the first picture.

The third acquisition unit may be used to obtain the place or location where the first picture was taken; based on the picture-taken location, to determine a second predetermined range including the obtained picture-taken location; and to determine another picture taken within the second predetermined range as the second picture corresponding to the first picture.

The second determination module 960 may be used to determine users associated with the second picture based on attribute information of the second picture obtained by the second acquisition module 950.

The second detection module 970 may be used to detect whether a common third user exists among the users associated with the first picture determined by the first determination module 920 and the users associated with the second picture determined by the second determination module 960.

The third detection module 980 may be used to, when the second detection module 970 detects that the third user exists, detect whether a fourth user and a fifth user are friends, where the fourth user is one of the users associated with the first picture other than the third user, and the fifth user is one of the user associated with the second picture other than the third user.

The second transmission module 990 may then be used to, when the third detection module 980 detects that the fourth user and fifth user are not friends, send friend recommended information to one of the fourth user and fifth user, and the friend recommendation information contains information about the other of the fourth user and the fifth user.

The above descriptions merely disclose certain embodiments of the present invention, and are not intended to limit the scope of the present invention. Without departing from the spirit and principles of the present invention, any modifications, equivalent replacements, and improvements, etc., should be included in the protection scope of the present invention. Therefore, the scope of the present disclosure should be defined by the attached claims.

INDUSTRIAL APPLICABILITY AND
ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art.

The disclosed methods, apparatus, and systems can be used in a variety of internet applications, especially in social networking services (SNS) applications. By using the disclosed methods and systems, the users for recommending friends are pre-screened using various attributes of pictures sent by the users to a social networking site to significantly increase the possibility of recommended users to become friends, i.e., it is much more likely that the friend recommendation information provided by a server of the social networking site is of real interest of the users receiving the information.

What is claimed is:

1. A method for friend recommendation, including:
   obtaining a first picture sent by a user of a client on a user terminal;
   determining one or more users associated with the first picture based on attribute information of the first picture;
   when it is determined that a total number of the users associated with the first picture is two or more, detecting whether a first user and a second user from the one or more users associated with the first picture are friends;
   when it is detected that the first user and the second user are not friends, sending friend recommendation information to one of the first user and the second user, wherein the friend recommendation information contains information of the other of the first user and the second user;
   obtaining a second picture corresponding to the first picture, wherein the second picture corresponds to the first picture when at least one type of the attribute information of the first picture is related to the same type of attribute information of the second picture, the same type of attribute information including at least one of a picture-taken time and a picture-taken location;
   determining users associated with the second picture based on the attribute information of the second picture;
   detecting whether a third user commonly exists among the users associated with the first picture and the users associated with the second picture;
   when it is detected that the third user exists, detecting whether a fourth user and a fifth user are friends, wherein the fourth user is one of the users associated with the first picture other than the third user, and the fifth user is one of the user associated with the second picture other than the third user; and
   when it is detected that the fourth user and fifth user are not friends, sending friend recommended information to one of the fourth user and fifth user, wherein the friend recommendation information contains information about the other of the fourth user and the fifth user.

2. The method according to claim 1, wherein the attribute information includes face information, and determining one or more users associated with the first picture further includes:
   performing a face recognition process on the first picture to obtain face information of at least one face from the first picture;
   respectively matching the obtained face information with identification image information corresponding to pre-stored users to determine certain users corresponding to the obtained face information; and
   designating the certain user corresponding to the face information as the users associated with the first picture.

3. The method according to claim 2, wherein matching the obtained face information with identification image information corresponding to pre-stored users to determine certain users further includes:
   obtaining a friend list of the user sending the first picture;
   obtaining identification image information corresponding to each user on the friend list; and
   matching the face information in the first picture respectively with the identification image information of each user on the friend list to determine the certain users corresponding to the face information.

4. The method according to claim 3, wherein the attribute information of the first picture includes source information, and determining the one or more users associated with the first picture further includes:
   based on the source information of the first picture, designating the user sending the first picture as the one or more users associated with the first picture.

5. The method according to claim 1, wherein obtaining a second picture corresponding to the first picture further includes:
   obtaining a picture-taken time of the first picture;
   based on the picture-taken time, determining a first predetermined range including the obtained picture-taken time; and
   determining another picture taken within the first predetermined range as the second picture corresponding to the first picture.

6. The method according to claim 1, wherein obtaining a second picture corresponding to the first picture further includes:
   obtaining a picture-taken location of the first picture;
   based on the picture-taken location, determining a second predetermined range including the obtained picture-taken location; and
   determining another picture taken within the second predetermined range as the second picture corresponding to the first picture.

7. A friend-recommendation apparatus, comprising:
   a first acquisition module configured to obtain a first picture sent by a user of a client on a client terminal;
   a first determination module configured to determine one or more users associated with the first picture based on attribute information of the first picture obtained by the first acquisition module;
   a first detection module configured to, when the first determination module determines that a total number of the users associated with the first picture is two or more, detect whether a first user and a second user from the one or more users associated with the first picture are friends;
   a first transmission module configured to, when the first detection module detects that the first user and the second user are not friends, send friend recommendation information to one of the first user and the second user, wherein the friend recommendation information contains information of the other of the first user and the second user;

a second acquisition module configured to obtain a second picture corresponding to the first picture obtained by the first acquisition module, wherein the second picture corresponds to the first picture when at least one type of the attribute information of the first picture is related to the same type of attribute information of the second picture, the same type of attribute information including at least one of a picture-taken time and a picture-taken location;

a second determination module configured to determine users associated with the second picture based on the attribute information of the second picture by the second acquisition module;

a second detection module configured to detect whether a third user commonly exists among the users associated with the first picture and the users associated with the second picture;

a third detection module configured to, when the second detection module detects that the third user exists, detect whether a fourth user and a fifth user are friends, wherein the fourth user is one of the users associated with the first picture other than the third user, and the fifth user is one of the user associated with the second picture other than the third user; and a second transmission module configured to, when the detection module detects that the fourth user and fifth user are not friends, send friend recommended information to one of the fourth user and fifth user, wherein the friend recommendation information contains information about the other of the fourth user and the fifth user.

8. The apparatus according to claim 7, wherein the attribute information includes face information, and the first determination module further includes:

a first acquisition unit configured to perform a face recognition process on the first picture to obtain face information of at least one face from the first picture;

a first determination unit configured to respectively match the face information obtained by the first acquisition unit with identification image information corresponding to pre-stored users to determine certain users corresponding to the obtained face information; and a second determination unit configured to designate the certain user corresponding to the face information as the users associated with the first picture.

9. The apparatus according to claim 8, wherein the first determination unit further includes:

a first acquisition sub-unit configured to obtain a friend list of the user sending the first picture;

a second acquisition sub-unit configured to obtain identification image information corresponding to each user on the friend list; and a determination sub-unit configured to match the face information obtained by the first acquisition unit respectively with the identification image information of each user on the friend list obtained by the second acquisition unit to determine the certain users corresponding to the face information.

10. The apparatus according to claim 8, wherein the attribute information of the first picture includes source information, and the first determination module further includes:

a third determination unit configured to, based on the source information of the first picture, designate the user sending the first picture as the one or more users associated with the first picture.

11. The apparatus according to claim 7, wherein the second acquisition module further includes a second acquisition unit configured to:

obtain picture-taken time of the first picture;

based on the picture-taken time, determine a first predetermined range including the obtained picture-taken time; and determine another picture taken within the first predetermined range as the second picture corresponding to the first picture.

12. The apparatus according to claim 7, wherein the second acquisition module further includes a second acquisition unit configured to:

obtain a picture-taken location of the first picture;

based on the picture-taken location, determine a second predetermined range including the obtained picture-taken location; and determine another picture taken within the second predetermined range as the second picture corresponding to the first picture.

13. A method for friend recommendation, including:

sending a first picture by a user of a client on a user terminal to a server, the first picture containing attribute information to be used for determining one or more users associated with the first picture;

when there are a total number of two or more users associated with the first picture, and a first user and a second user from the one or more users associated with the first picture are not friends, receiving friend recommendation information by a user terminal corresponding to one of the first user and the second user, wherein the friend recommendation information contains information of the other of the first user and the second user;

obtaining, by the server, a second picture corresponding to the first picture, wherein the second picture corresponds to the first picture when at least one type of the attribute information of the first picture is related to the same type of attribute information of the second picture, the same type of attribute information including at least one of a picture-taken time and a picture-taken location; and when there is a third user commonly exists among the users associated with the first picture and the users associated with the second picture, a fourth user is one of the users associated with the first picture other than the third user, a fifth user is one of the user associated with the second picture other than the third user, and the fourth user and the fifth user are not friends, receiving friend recommendation information by a user terminal corresponding to one of the fourth user and the fifth user, wherein the friend recommendation information contains information of the other of the fourth user and the fifth user.

14. The method according to claim 13, wherein the attribute information includes face information, and the first user and the second user are on a friend list of the user sending the first picture.

15. The method according to claim 13, wherein the one or more users associated with the first picture are determined by:

performing a face recognition process on the first picture to obtain face information of at least one face from the first picture;

respectively matching the obtained face information with identification image information corresponding to pre-stored users to determine certain users corresponding to the obtained face information; and designating the certain user corresponding to the face information as the users associated with the first picture.

16. The method according to claim 15, wherein matching the obtained face information with identification image information corresponding to pre-stored users to determine certain users further includes:

obtaining the friend list of the user sending the first picture;

obtaining identification image information corresponding to each user on the friend list; and matching the face information in the first picture respectively with the identification image information of each user on the friend list to determine the certain users corresponding to the face information.

17. The method according to claim 1, wherein the attribute information of a picture includes face information, source information, a picture-taken time, a picture-taken location, one or more user-edited labels, one or more pets in the picture, one or more landmarks in the picture, one or more cartoon images in the picture, or a combination thereof.

18. The method according to claim 1, wherein the same type of attribute information further includes one or more user-edited labels, one or more pets in the picture, one or more landmarks in the picture, one or more cartoon images in the picture, or a combination thereof.

19. The method according to claim 13, wherein the second-type attribute information includes a picture-taken time, and obtaining a second picture corresponding to the first picture further includes:

obtaining a picture-taken time of the first picture;

based on the picture-taken time, determining a first predetermined range including the obtained picture-taken time; and identifying another picture taken within the first predetermined range as the second picture corresponding to the first picture.

20. The method according to claim 13, wherein the second-type attribute information includes a picture-taken location, and obtaining a second picture corresponding to the first picture further includes:

obtain a picture-taken location of the first picture;

based on the picture-taken location, determine a second predetermined range including the obtained picture-taken location; and determine another picture taken within the second predetermined range as the second picture corresponding to the first picture.

\* \* \* \* \*